C. E. CLARK.
CLOTH CUTTER.
APPLICATION FILED AUG. 6, 1918.
1,309,317.
Patented July 8, 1919.
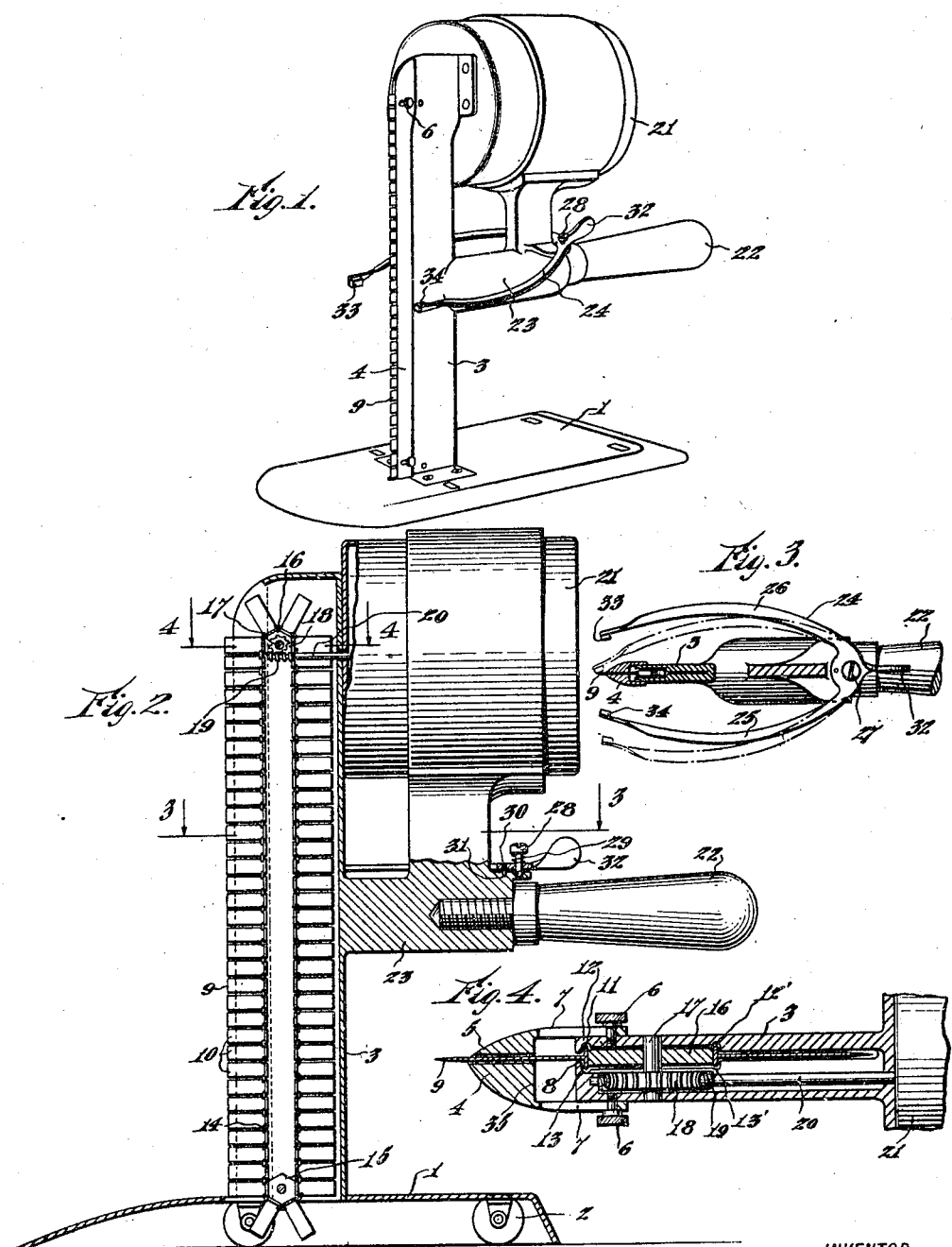
WITNESSES
INVENTOR
Chester E. Clark
BY
ATTORNEYS

UNITED STATES PATENT OFFICE.

CHESTER E. CLARK, OF NEW YORK, N. Y.

CLOTH-CUTTER.

1,309,317.     Specification of Letters Patent.     Patented July 8, 1919.

Application filed August 6, 1918. Serial No. 248,592.

*To all whom it may concern:*

Be it known that I, CHESTER E. CLARK, a citizen of the United States, and a resident of the city of New York, borough of Manhattan, in the county and State of New York, have invented a new and Improved Cloth-Cutter, of which the following is a full, clear, and exact description.

This invention relates to cloth cutters and has for an object the provision of an improved construction wherein the knife used will continually move across the cloth in the same direction.

Another object in view is to provide a cloth cutter with a built up knife arranged in sections so that the cutting of the knife will always act in the same direction.

A still further object of the invention is to provide a cloth cutter in which a pivotally mounted sharpening device is provided for sharpening the knives at any time.

In the accompanying drawings:

Figure 1 is a perspective view of a cloth cutter disclosing an embodiment of the invention.

Fig. 2 is a longitudinal vertical section through the cutter shown in Fig. 1, certain parts being shown in elevation.

Fig. 3 is a transverse sectional view through Fig. 2 on line 3—3.

Fig. 4 is a fragmentary sectional view through Fig. 2 on line 4—4.

Referring to the accompanying drawing by numerals, 1 indicates a base formed hollow as shown in Fig. 2, the front end tapering rounded and the rear end somewhat inclined so that it may pass freely over a table and beneath the goods which are being cut. Any desired number of rollers 2 are provided for supporting the base and associate parts, said rollers being preferably of a size to hold the base 1 a very short distance above the table. A casing 3 is connected with the base 1 and extends vertically therefrom, said casing having a front adjustable section 4 provided with a slot 5, said section being in two parts clamped to the casing 3 by any suitable means, as for instance screws 6 operating in slots 7. The casing 3 is provided with a slot 8 registering with slot 5 for guiding the knife 9. The knife 9 is divided into a plurality of sections 10, each section having a base 11 adapted to move in the grooves 12 and 13 whereby the sections are guided in a straight line as they move up and down. The bases 11 are connected together by a suitable hinged construction 14 whereby the blade 9 may freely pass around the rollers 15 and 16 at the bottom and top of the casing 3. These rollers are hexagon shape and are of such size as to cause the sections 10 to fall short of hitting the table when the device is moved thereover. It is, of course, understood that the walls 15 are many sided, and could be hexagon, octagon, or other shape as desired without departing from the spirit of the invention. The wheel 16 is connected rigidly with shaft 17 which in turn carries a worm wheel 18 meshing with worm 19. Worm 19 is driven by a shaft 20 connected with the cutter 21, whereby whenever the current is turned on to the motor the parts will operate. A handle 22 is provided on the bracket 23 of casing 3 whereby the device may be pushed along the table during the cutting operation or whenever desired.

A sharpening device 24 is provided formed with arms 25 and 26 pivotally mounted at 27 on pin 28. A spring 29 surrounds pin 28 and acts to hold the device 24 in a lowered position so that the pin 30 carried thereby will remain in the socket 31. When it is desired to sharpen the knife 9 the thumb member 32 is grasped and the entire structure 24 raised until pin 30 is out of socket 31 whereby the parts are swung to one side, as for instance to the position shown in dotted lines in Fig. 3, whereby the abrading or sharpening member 33 will engage one side of the blade 9 and later the parts are moved to the opposite position so that the abrading or sharpening member 34 will engage the opposite side of blade 9. It will, of course, be understood that the blade 9 is moving when this operation of sharpening takes place so that the various sections 10 may be properly sharpened. After the sharpening operation is over the arms 25 and 26 are moved to the position shown in Fig. 3 and then raised whereupon the spring 29 will lower said arms and pin 30 will again engage socket 31 whereby the parts are locked against further movement.

Whenever the knife 9 becomes worn to a considerable extent the adjustable section 4 is moved back a short distance so as to expose more of the blade. This may be done until the rear wall 35 of the section 4 engages the front of casing 3. As shown in Fig. 4 the bases 11 of the various sections 10 are guided by grooves 12 and 13 and 12' and 13' both on their upward and downward travel. This arrangement will hold the parts in proper position notwithstanding the pressure of the goods against the blades on their downward travel. It will be understood that the cutting edge which projects beyond member 4 moves downwardly continually and thereby produces always a downward pressure or cutting action that will not only act to cut the goods in the proper manner, but will have a tendency to hold the goods in a flat condition during the operation of the machine.

What I claim is:

1. A cloth cutter comprising an endless knife formed in a plurality of sections hinged together, each section having a flat transversely extending base, a pair of spaced wheels acting as pulleys over which said endless knife passes, means for rotating one of said wheels so as to drive said knife continually in one direction, a supporting base, and a standard arranged on the base formed with grooves for receiving the base of the respective sections for guiding the knife and holding the sections thereof in alinement.

2. A cloth cutter comprising a base, a hollow standard, a power member, a pair of wheels one arranged at the bottom of the base and the other near the top, an endless knife arranged on said wheels, said knife being formed of a plurality of independent sections hinged together so as to pass around said wheels, means for connecting the top wheel with the power member so that the wheels will be driven together with the knife, an adjustable guiding extension arranged on said standard formed with a slot through which the sections of said knife pass on their downward travel, and means for locking said adjustable sections in any desired position.

3. A cloth cutter comprising a base, a hollow standard, a power member connected with said standard, a polygonal wheel at each end of said standard, an endless knife arranged on said wheels, said knife being formed of a plurality of sections, each section having a flat transversely extending base portion to fit against one of the flat sections of the respective wheels as the knife is operated, said sections being hinged together, and means for connecting said power member with the upper wheel for driving said upper wheel and the knife.

4. A cloth cutter comprising a base, a hollow standard, a power member, a pair of wheels one arranged at the bottom of the base and the other one near the top, an endless knife arranged on said wheels, said knife being formed of a plurality of independent sections hinged together so as to pass around said wheels, means for connecting the top wheel with said power member, a front guide for said knife formed with slots, and clamping means extending through said slots, said slots extending transversely of the base whereby the guide may be adjusted toward and from the edge of the knife and thereby guide said independent sections when new and comparatively long as well as when old and comparatively short.

CHESTER E. CLARK.